United States Patent
Burger et al.

(10) Patent No.: US 6,182,759 B1
(45) Date of Patent: Feb. 6, 2001

(54) PROCESS FOR TREATING WATER-CONTAINING NATURAL GAS WELLS AND NATURAL GAS STORAGE WELLS

(75) Inventors: Willibald Burger; Hans Mayer, both of Burghausen; Robert Schröck, Altötting; Holger Wöltje; Bernward Deubzer, both of Burghausen, all of (DE); Hans Lautenschlager, Greer, SC (US)

(73) Assignee: Wacker-Chemie GmbH, München (DE)

( * ) Notice: Under 35 U.S.C. 154(b), the term of this patent shall be extended for 0 days.

(21) Appl. No.: 09/169,543

(22) Filed: Oct. 9, 1998

(30) Foreign Application Priority Data

Oct. 16, 1997 (DE) .............................. 197 45 736

(51) Int. Cl.⁷ .................................. E21B 43/25
(52) U.S. Cl. ........................ 166/305.1; 166/279
(58) Field of Search ................... 166/279, 292, 166/295, 305.1

(56) References Cited

U.S. PATENT DOCUMENTS

| | | | |
|---|---|---|---|
| 3,108,635 | * 10/1963 | Chittum | 166/310 |
| 4,425,242 | 1/1984 | Penny et al. | |
| 5,346,013 | 9/1994 | Pusch et al. | |
| 5,383,943 | * 1/1995 | Ogawa et al. | 47/58 |
| 5,921,319 | * 7/1999 | Curtice | 166/279 |

FOREIGN PATENT DOCUMENTS

WO 98/27314   6/1998  (WO) .

OTHER PUBLICATIONS

Database WPI, Section Ch, Week 9235, Derwent Publications Ltd., London, GB; AN–92–290715, XP00284777 & SU 1 680 949 A (Sibe Oil Ind Inst), Sep. 30, 1980.
Database, WPI, Section Ch, Week 8125, Derwent Publications, Ltd., London, GB; AN 81–45427D, XP002084778 & SU 767 152 B (Kovardakov VA), Sep. 30, 1980.
Database, WPI, Section Ch, Week 9719, Derwent Publications, Ltd., London, GB; AN 97–211347, XP002084779 & RU 2 066 734 C(Stroganov VM), Sep. 20, 1996.
Database, WPI, Section Ch, Week 9719, Derwent Publications, Ltd., London, GB; AN 82–11187E, XP002084780 & SU 821 686 B (Sibe Oil Ind Res), Apr. 15, 1981.

* cited by examiner

Primary Examiner—William Neuder
(74) Attorney, Agent, or Firm—Brooks & Kushman P.C.

(57) ABSTRACT

The gas flow in water-containing natural gas wells and natural gas storage wells is improved if a homogeneous phase comprising a water-repellent, solvolysis-resistant active compound is injected into the water-bearing rock.

9 Claims, No Drawings

PROCESS FOR TREATING WATER-CONTAINING NATURAL GAS WELLS AND NATURAL GAS STORAGE WELLS

TECHNICAL FIELD

The invention relates to a process for treating water-containing natural gas wells and natural gas storage wells in which a homogeneous phase containing a water-repellent, solvolysis-resistant active compound is injected.

DESCRIPTION OF THE RELATED ART

Natural gas fields and natural gas storages are encountered in natural subterranean rock cavities. Natural gas storages are also encountered in artificial cavities. These subterranean rocks are by origin either sedimentary rocks or evaporites. These rocks are never dry, and are usually in communication with stratum waters, in many cases with extensive aquifers. Water, in particular in the form of salt solutions, therefore is often encountered on sinking a well, during the cementing of the casing, and in the production phase of gas fields. Drying out water-containing zones and blocking water influx in production wells is necessary for economic reasons, in order to maintain continuous gas flow and to avoid or decrease the disposal of the transported water, which is associated with high costs.

A special case occurs in gas fields or gas storages in which the stratum pressure has already fallen markedly below the hydrostatic pressure. Stratum water can only penetrate into a well if the water saturation in the vicinity of the well is high enough in order to ensure continuous flow, and the water phase has sufficient expansion energy and/or is entrained by the gas. Owing to the higher water saturation in the pore region, the pressure drops increase on flow of the gas phase, and the flow pressure on the well hole bottom decreases, as a result of which the water column in the well hole can increase. If the well hole flow pressure is no longer sufficient, a phase of discontinuous gas production with decreased flow rates occurs.

The reduction of the influx of water into production wells can be effected by two methods: selected blocking, and plugging. Of the various process variants for sealing off water influxes into wells and in the cementing operation, plugging methods generally are used.

For example, the Derwent Abstract of SU 1315602 describes the use of a mixture of tetrabutoxytitanium having a relatively low content of tetrabutoxysilane or tetraethoxysilane for plugging wells against water ingress. The Derwent Abstract of SU 1838587 describes the use of ethylsilicates for sealing off oil and gas wells from percolating water. In both cases, the gas permeability is also greatly reduced.

Other substances used for plugging are cements, swellable clays, epoxide resins having additives of fiber, and especially useful in the case of fissured rocks, gels, suspensions containing additives and finely divided silicon dioxide. For plugging water influxes, these must be delimitable, so that the remaining productive zones of the rock do not also suffer. A plugging action can be exerted by gels of polymeric solutions of polyacrylamide, copolymers and biopolymers, and silica gels are also mentioned in some applications. The gellation of the polymer solution is effected by admixing or after flooding crosslinking substances. Another possible method of exerting plugging actions is by precipitation of inorganic salts or organic polymers from aqueous or non-aqueous solvents.

For selective blocking of the water influxes over the entire thickness of the hydrocarbon-bearing strata, no precautions need to be taken for selecting the points of water ingress. The selective blocking is performed by two process variants, that is by adsorption of hydrophilic polymers or by rendering rock surfaces hydrophobic.

The hydrophilic adsorption layers increase the flow resistance for the flowing water, which is frequently increased by swelling of the adsorption layer. For the hydrocarbon phase, in contrast, there is no significant decrease in the permeability. When the rock surface is rendered hydrophobic, the surface tension has a partial blocking action for the penetrating water in the form of the capillary counterpressure.

For selective blocking, use is generally made of high molecular weight polymers based on polyacrylamide (also in cationic form), copolymers, terpolymers and biopolymers. For rendering the rock surfaces hydrophobic, inter alia, silanes have also been tested.

The flow resistance of the blocked rock formation must be sufficient to impede the water at the entry to the production well. However, the flow resistance cannot be increased as desired, since the liquids injected for the blocking must be distributed in the rock to develop their blocking action and the gas must thereafter flush clear its flow paths by displacing the excess non-adsorbed treatment liquid. In particular, in the case of low rock permeability, the flow resistance must not be excessive, because otherwise the treatment liquid is not injectable and the gas is not able to penetrate the treatment ring. Thus plugging instead of blocking takes place.

A further special case is represented by the gas fields in which the water is very salty. There, evaporation of water in the vicinity of the well hole causes the solubility limit to be exceeded; in particular chloride salts crystallize out. Since salt water is continuously drawn into the pore cavities by capillary forces, the salt crystals continue to grow until the flow channels are closed to the point of impermeability to natural gas.

The current process for improving the productivity of natural gas wells is the hydraulic generation and stabilization of fractures in the surrounds of the well hole. The additional drainage areas produced by this means and the high gas flow density in the fractures leads to an increased well production rate. However, this process is very expensive. The fracture formation can be controlled only to a very limited extent.

Salt deposits, in particular chloride salts, can be removed by flushing with fresh water. Since the salt deposits continuously reform, these flushings must be carried out regularly, which causes frequent production outages.

It would be desirable to provide a means which permanently improves gas flow in water-containing natural gas wells and natural gas storage wells.

SUMMARY OF THE INVENTION

The invention relates to a process for treating water-containing natural gas wells and natural gas storage wells in which a homogeneous phase comprising a water-repellent, solvolysis-resistant active compound is injected into the water-bearing rock.

DESCRIPTION OF THE PREFERRED EMBODIMENT

Preferably, the homogeneous phase is injected into the water-bearing rock by means of a well. In this case, the active compound is adsorbed or reacts on the rock surface. Excess homogeneous phase is preferably distributed in the surrounds of the well by recompressing gas. The gas used can be, for this purpose, for example, air, nitrogen or, preferably, natural gas.

The homogeneous phase can be readily distributed in the rock of the natural gas-containing fields and has chemical inertness to the natural gas and the transport devices.

Owing to the selective adsorption of water-repellent active compound, the flow resistance in the rock greatly increases for water, and that for gas falls. The water influx is therefore reduced and natural gas can flow better. Natural gas is virtually insoluble in the active compound and can, if no excess homogeneous phase obstructs the flow paths, flow through virtually unhindered to the production well. The surface-smoothing action of the adsorption layer decreases the friction pressures for injected and transported gas. This causes an increased production rate for natural gas at the well hole.

In addition, in rock zones rendered hydrophobic, into which no water flows, the capillary flow of water is greatly decreased and the treated area gradually dries out by evaporation of the water.

The drying out of the rock in the surrounds of the well avoids the plugging of the capillaries of the rock and salt deposits on equipment for transport, storage and further processing.

Since, at the same capillary pressure, the water saturation in rock of low permeability having narrow capillaries is greater than in more highly permeable rock, the process is particularly suitable for fields having low permeability, where heterogeneous systems can no longer be injected and plugging of the pores in the natural gas field can occur. The process can be carried out at rock permeabilities of preferably at least 0.0001 $\mu m^2$. In addition, use of the method with heterogeneous field rock having varying permeability leads to homogenization of the flow profile in the vicinity of the well hole.

Since the water-repellent active compound is solvolysis-resistant, the homogeneous phase can be handled considerably more readily than homogeneous phases having solvolyzing active compounds, and it is always ensured that the active compound is employed in the form injected. There is thus no risk that the homogeneous phase, due to solvolysis prior to reaching the point of action, becomes a heterogeneous phase which can then cause precipitations or plugging in the well hole or in the rock in the vicinity of the well hole. At the point of action itself, the homogeneous phase may become a heterogeneous phase. For example, use may be made of aqueous methylsiliconate solutions which, with $CO_2$, form water-repellent and non-water-soluble active compounds.

The water-repellent active compound has the property of not penetrating into water at the point of action, and not remaining therein. The water- repellent active compound is, at the point of action, soluble in water at 20° C. preferably to an extent of at most 1% by weight, in particular, at most 0.1% by weight.

In the process according to the invention, as water-repellent substances, use can be made of, for example, unfluorinated or fluorinated waxes, paraffins, salts of carboxylic acids, organic or organosilicon monomers or polymeric compounds.

Suitable waxes are, for example, natural waxes such as vegetable waxes, e.g. candellila and carnauba wax; animal waxes, e.g. beeswax and lanolin; mineral waxes, e.g. ceresin and ozokerite; chemically modified natural, and in particular fluorinated, waxes and synthetic waxes, e.g. polyethylene waxes and silicone waxes.

Suitable salts of carboxylic acids are, in particular, the salts of monobasic or polybasic carboxylic acids having from 8 to 50 carbon atoms per carboxyl group. Preference is given to the salts of fluorinated carboxylic acids, in particular when these have a perfluoroalkyl radical having at least 4 carbon atoms. Examples of preferred salts of monobasic fluorinated carboxylic acids are the alkali metal salts of arylcarboxylic acids, such as benzoic acids or naphthoic acids bearing one or two perfluoroalkyl radicals having preferably 4 to 18 carbon atoms.

As fluorinated organic polymeric compounds, use can be made in the process according to the invention, for example, of all those compounds which have also previously been able to be used or have been used for rendering organic substances, such as organic fibers, and inorganic substances water-repellent. Examples of such compounds are polymers prepared from at least partially fluorinated monomers, such as polytetrafluoroethylene, copolymers of tetrafluoroethylene and hexafluoropropylene, poly(vinyl fluoride), poly (vinylidene fluoride), polytrifluorochloroethylene, copolymers of trifluorochloroethylene and other monomers, such as vinylidene fluoride, vinyl chloride, vinyl acetate, methyl methacrylate or styrene; and fluorinated acrylic resins, such as homopolymers and copolymers of perfluoroalkyl-containing acrylic and methacrylic esters with acrylic acid and methacrylic acid and their derivatives.

Preferred examples of fluorinated acrylic resins are poly (1,1-dihydroperfluorobutyl acrylate) and mixed polymers of n-butyl acrylate, N-methylolacrylamide and at least 35% by weight of 1,1,2,2-tetrahydroperfluoro-$C_1$ to $C_{16}$-alkyl methacrylate having a linear alkyl chain.

Further examples of such fluorinated acrylic resins are the alkali metal salts of copolymers of the abovementioned acrylates, methacrylates, acrylic acid and methacrylic acid which preferably have a fluorine content of at least 20% by weight.

Further examples of fluorinated organic polymeric compounds are synthetic organic polymers fluorinated after polymerization, such as poly(vinyl chloride), polyethylene, polypropylene, poly(vinyl acetate), poly(vinyl alcohol), polycarbonate, polyacrylate, polymethacrylate, poly(methyl methacrylate), polystyrene, polyacrylonitrile, poly (vinylidene chloride), poly(vinyl fluoride), poly(vinylidene fluoride), poly(vinylidene cyanide), polybutadiene, polyisoprene, polyether, polyester, polyamide, polyurethane, polyimide, silicones, polyvinylpyrrolidone, polyacrylamide, poly(ethylene glycol) and their derivatives, which are fluorinated in the side chains or in the main chains. The polymers fluorinated after polymerization preferably have a fluorine content of at least 10% by weight. Particular preference is given to polyurethane resins having a fluorine content of 25–35% by weight.

In particular, preference is given as water-repellent active compound to organosilicon compounds, since these are heat-stable at temperatures prevailing in fields of 130° C. and considerably higher. The action rendering rock surface hydrophobic persists for a long period.

Examples of organosilicon compounds are organosilicon compounds which contain units of the general formula I

where
R denotes a hydrogen atom or a monovalent, divalent or trivalent hydrocarbon radical having 1 to 200 carbon atoms, which can be substituted by halogen, amino, ammonium, mercapto, acrylate or maleimide groups, X denotes a chlorine atom, a radical of the formula —O⁻, where as a balance of the charges, protons and/or organic or inorganic ionic substances can be present, a radical of the general formula —OR$^1$ or a radical of the general formula II

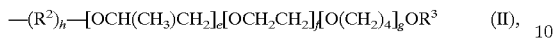

where

R$^1$ denotes a hydrogen atom or a hydrocarbon radical having 1 to 200 carbon atoms, which can be interrupted by one or more identical or different heteroatoms which are selected from the group consisting of O, S, N and P, R$^2$ denotes a divalent hydrocarbon radical having 1 to 200 carbon atoms which can be interrupted by one or more groups of the formulae —C(O)—, —C(O)O—, —C(O)NR$^1$—, —NR$^1$—, —N$^+$HR$^1$—, —O—, —S— and/or can be substituted by F, Cl or Br, R$^3$ can have a meaning of R$^1$, or denotes a radical of the formulae —C(O)R$^1$ or —Si(R$^1$)$_3$, A denotes a radical of the general formula IV

where

R$^4$ denotes a divalent, trivalent or tetravalent hydrocarbon radical having 1 to 200 carbon atoms per radical, which can be interrupted by one or more groups of the formulae —C(O)—, —C(O)O—, —C(O)NR$^5$, —NR$^5$—, —N$^+$HR$^5$—, —N$^+$R$^5$R$^5$—, —O—, —S—, —(HO)P(O)— or —(NaO)P(O)— and/or can be substituted by F, Cl or Br, where R$^5$ denotes a hydrogen atom or a hydrocarbon radical having 1 to 200 carbon atoms per radical, which can be interrupted by one or more groups of the formulae —C(O)—, —C(O)O—, —C(O)NR$^5$—, —NR$^5$—, —N$^+$HR$^5$—, —N$^+$R$^5$R$^5$—, —O— or —S—, and/or can be substituted by F, Cl or Br, B can have a meaning of R$^5$ or denotes a radical which is selected from the group consisting of —COO⁻, —SO$_3$⁻, —OPO$_3$H$_y$$^{(2-y)-}$, —N$^+$R$^5$R$^5$R$^5$, —P$^+$R$^5$R$^5$R$^5$, —NR$^5$R$^5$, —OH, —SH, F, Cl, Br, —C(O)H, —COOH, —SO$_3$H, —C$_6$H$_4$—OH and —C$_m$F$_{2m+1}$,

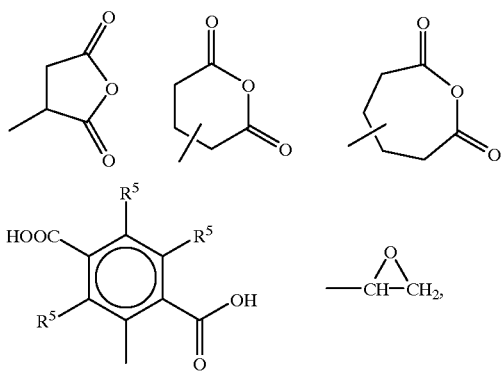

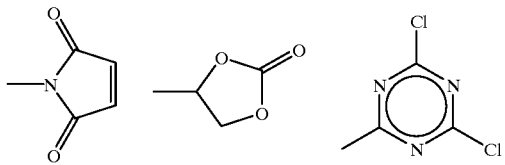

x denotes an integer from 1 to 20,
y denotes the values 0 or 1,
z depending on the valency of R$^4$, denotes the values 1, 2 or 3,
h denotes the values 0 or 1,
m denotes an integer from 1 to 20,
a, b and c each denote the values 0, 1, 2 or 3 and the sum a+b+c<4 and
e, f and g each denote an integer from 0 to 200, with the proviso that the sum e+f+g>1.

To balance the charges in the radicals A, R and X, if appropriate, protons and/or organic or inorganic ionic substances can be present, such as alkali metal ions, alkaline earth metal ions, ammonium ions, halide ions, sulfate ions, phosphate ions, carboxylate ions, sulfonate ions or phosphonate ions.

In addition, the organosilicon compounds may contain units of the general formulae (V) and (VI),

where

A$^2$ denotes a trivalent hydrocarbon radical having 1 to 200 carbon atoms, which can be interrupted by radicals of the formulae —C(O)—, —C(O)O—, —C(O)NR$^5$, —NR$^5$—, —N$^+$HR$^5$—, —N$^+$R$^5$R$^5$—, —O—, —S—, —N— or —N$^+$R$^5$— and/or can be substituted by F, Cl or Br, A$^1$ signifies a divalent radical R$^2$, i and k each denote the values 0, 1, 2 or 3, with the proviso that i+k≦3 and R and X have the meanings given above.

The above listed hydrocarbon radicals R, R$^1$, R$^2$, R$^3$, R$^4$, R$^5$, A$^1$ and A$^2$ can be saturated, unsaturated, linear, cyclic, aromatic or non-aromatic.

Examples of hydrocarbon radicals R are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals; hexyl radicals such as the n-hexyl radical; heptyl radicals such as the n-heptyl radical; octyl radicals such as the n-octyl radical, and isooctyl radicals such as 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl, cycloheptyl and methylcyclohexyl radicals; aryl radicals such as the phenyl, naphthyl, anthryl and phenanthryl radicals; alkaryl radicals such as o-, m-, and p-tolyl radicals; xylyl and ethylphenyl radicals; and aralkyl radicals, such as the benzyl, and α- and β-phenylethyl radicals.

Preference is given to hydrogen or methyl, ethyl, octyl and phenyl; particular preference is given to hydrogen or methyl and ethyl.

Examples of halogenated radicals R are haloalkyl radicals, such as 3,3,3-trifluoro-n-propyl, 2,2,2,2', 2', 2'-hexafluoroisopropyl, heptafluoroisopropyl and haloaryl radicals, such as o-, m-, and p-chlorophenyl.

Examples of radical $R^1$ are the examples specified for radical R. identical to alkyl radicals, and methoxyethyl and ethoxyethyl, where radical $R^1$ preferably denotes alkyl radicals having 1 to 50 carbon atoms, which can be interrupted by oxygen atoms, particularly preferably methyl and ethyl.

Examples of organic or inorganic substances for balancing the charges for X=—O⁻ are alkali metal and alkaline earth metal ions, ammonium and phosphonium ions and monovalent, divalent or trivalent metal ions, preferably alkali metal ions, particularly preferably $Na^+$ and $K^+$.

Examples of radical X are methoxy and ethoxy and compounds corresponding to the general formula (II) such as
—$(CH_2)_3$—$(OCH_2CH_2)_3$—$OCH_3$, —$(CH_2)_3$—$(OCH_2CH_2)_6$—$OCH_3$,
—$(CH_2)_3$—$(OCH_2CH_2)_{35}$—$OCH_3$,
—$(CH_2)_3$—$(OCH(CH_3)CH_2)_3$—$OCH_3$, —$(CH_2)_3$—$(OCH(CH_3)CH_2)_6$—$OCH_3$,
—$(CH_2)_3$—$(OCH(CH_3)CH_2)_{35}$—$OCH_3$,
—$(CH_2)_3$—$(OCH_2CH_2)_3$—$(OCH(CH_3)CH_2)_3$—$OCH_3$,
—$(CH_2)_3$—$(OCH_2CH_2)_6$—$(OCH(CH_3)CH_2)_6$—$OCH_3$,
—$(CH_2)_3$—$(OCH_2CH_2)_{35}$—$(OCH(CH_3)CH_2)_{35}$—$OCH_3$,
—$(CH_2)_3$—$(OCH_2CH_2)_3$—$OSi(CH_3)_3$, —$(CH_2)_3$—$(OCH_2CH_2)_6$—$OSi(CH_3)_3$,
—$(CH_2)_3$—$(OCH_2CH_2)_{35}$—$OSi(CH_3)_3$,
—$(CH_2)_3$—$(OCH_2CH_2)_3$—$OC(O)CH_3$, —$(CH_2)_3$—$(OCH_2CH_2)_6$—$OC(O)CH_3$,
—$(CH_2)_3$—$(OCH_2CH_2)_{35}$—$OC(O)CH_3$,
—$(OCH_2CH_2)_3$—$OH$, —$(OCH_2CH_2)_6$—$OH$, —$(OCH_2CH_2)_{35}$—$OH$,
—$(OCH(CH_3)CH_2)_3$—$OH$, —$(OCH(CH_3)CH_2)_6$—$OH$,
—$(OCH(CH_3)CH_2)_{35}$—$OH$, —$(OCH_2CH_2)_3$—$(OCH(CH_3)CH_2)_3$—$OH$,
—$(OCH_2CH_2)_6$—$(OCH(CH_3)CH_2)_6$—$OH$,
—$(OCH_2CH_2)_{35}$—$(OCH(CH_3)CH_2)_{35}$—$OH$;
—$(OCH_2CH_2)_{18}$—$(O(CH_2)_4)_{18}$—$OH$
—$(OCH_2CH_2)_3$—$OCH_3$, —$(OCH_2CH_2)_6$—$OCH_3$, —$(OCH_2CH_2)_{35}$—$OCH_3$,
—$(OCH(CH_3)CH_2)_3$—$OCH_3$, —$(OCH(CH_3)CH_2)_6$—$OCH_3$,
—$(OCH(CH_3)CH_2)_{35}$—$OCH_3$, —$(OCH_2CH_2)_3$—$(OCH(CH_3)CH_2)_3$—$OCH_3$,
—$(OCH_2CH_2)_6$—$(OCH(CH_3)CH_2)_6$—$OCH_3$,
—$(OCH_2CH_2)_{35}$—$(OCH(CH_3)CH_2)_{35}$—$OCH_3$,
—$(OCH_2CH_2)_3$—$OSi(CH_3)_3$, —$(OCH_2CH_2)_6$—$OSi(CH_3)_3$,
—$(OCH_2CH_2)_{35}$—$OSi(CH_3)_3$,
—$(OCH_2CH_2)_3$—$OC(O)CH_3$, —$(OCH_2CH_2)_6$—$OC(O)CH_3$,
—$(OCH_2CH_2)_{35}$—$OC(O)CH_3$,
—$(OCH_2CH_2)_3$—$OH$, —$(OCH_2CH_2)_6$—$OH$, —$(OCH_2CH_2)_{35}$—$OH$,
—$(OCH(CH_3)CH_2)_3$—$OH$, —$(OCH(CH_3)CH_2)_6$—$OH$,
—$(OCH(CH_3)CH_2)_{35}$—$OH$, —$(OCH_2CH_2)_3$—$(OCH(CH_3)CH_2)_3$—$OH$,
—$(OCH_2CH_2)_6$—$(OCH(CH_3)CH_2)_6$—$OH$,
—$(OCH_2CH_2)_{35}$—$(OCH(CH_3)CH_2)_{35}$—$OH$ and
—$(OCH_2CH_2)_{18}$—$(O(CH_2)_4)_{18}$—$OH$.

Examples of radicals $R^2$ are linear or branched, substituted or unsubstituted hydrocarbon radicals preferably having 2 to 10 carbon atoms, where saturated or unsaturated alkylene radicals are preferred, and ethylene or propylene are particularly preferred.

Examples of radicals $R^3$ are the examples specified for R identical to alkyl or aryl radicals, and radicals of the formula —$C(O)R^1$ or —$Si(R^1)_3$, where methyl, ethyl, propyl and butyl, and trialkylsilyl and —$C(O)$— alkyl are preferred, and methyl, butyl, —$C(O)$—$CH_3$ and trimethylsilyl are particularly preferred.

Examples of $R^4$ are radicals of the formulae
—$(CH_2)_3$—
—$(CH_2)_3$—O—$(CH_2$—
—$(CH_2)_3$—O—$(CH_2$—$CH_2O)_n$—
—$(CH_2)_3$—O—$CH_2$—$CH(OH)$—$CH_2$—
—$(CH_2)_3$—NH—$(CH_2)_2$—
—$(CH_2)_3$—NH—$C(O)$—
—$(CH_2)_3$—NH—$(CH_2)_2$—$C(O)$—O—
—$(CH_2)_3$—NH—$(CH_2)_2$—$C(O)$—O—$(CH_2)_2$—
—$(CH_2)_3$—NH—$(CH_2)_2$—NH—$C(O)$—CH=CH—
—$(CH_2)_3$—NH—$C(O)$—CH=CH—
—$(CH_2)_3$—$C_6H_4$—

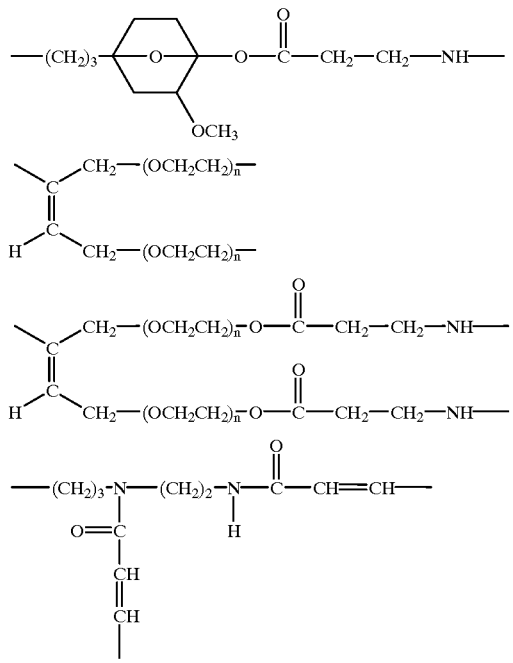

Preference as $R^4$ is given to radicals of the formula
—$(CH_2)_3$—
—$(CH_2)_3$—NH—$(CH_2)_2$—
—$(CH_2)_3$—O—$CH_2$—$CH(OH)$—$CH_2$—

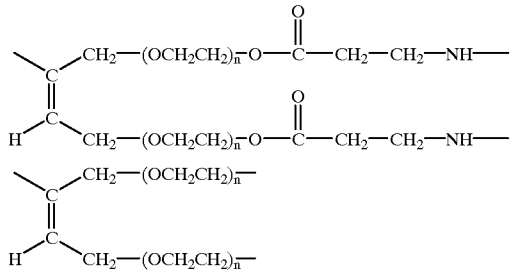

Particular preference as $R^4$ is given to —$(CH_2)_3$— and —$(CH_2)_3$—NH—$(CH_2)_2$—.

Examples of $R^5$ are the alkyl and aryl radicals listed above for R and radicals of the formulae
—$C(O)$—$CH_3$ —(CH$_2$CH$_2$O)$_3$—CH$_3$, —(CH$_2$CH$_2$O)$_6$—CH$_3$,
—(CH$_2$CH$_2$O)$_{35}$—C$_3$,
—(CH(CH$_3$)CH$_2$O)$_3$—CH$_3$, —(CH(CH$_3$)CH$_2$O)$_6$—CH$_3$,
—(CH(CH$_3$)CH$_2$O)$_{35}$—CH$_3$, —(CH$_2$CH$_2$O)$_3$—(CH(CH$_3$)
CH$_2$O)$_3$—CH$_3$,
—(CH$_2$CH$_2$O)$_5$—(CH$_2$—CH(CH$_3$)O)$_5$—CH$_3$,
—(CH$_2$CH$_2$O)$_{10}$—(CH$_2$—CH(CH$_3$)O)$_{10}$—CH$_3$,
—(CH$_2$CH$_2$O)$_3$—Si(CH$_3$)$_3$, —(CH$_2$CH$_2$O)$_6$—Si(CH$_3$)$_3$,
—(CH$_2$CH$_2$O)$_{35}$—Si(CH$_3$)$_3$,
—(CH$_2$CH$_2$O)$_5$—(CH$_2$—CH(CH$_3$)O)$_5$—Si(CH$_3$)$_3$,
—(CH$_2$CH$_2$O)$_{10}$—(CH$_2$—CH(CH$_3$)O)$_{10}$—Si(CH$_3$)$_3$,
—(CH$_2$CH$_2$O)$_3$—C(O)CH$_3$, —(CH$_2$CH$_2$O)$_6$—C(O)CH$_3$,
—(CH$_2$CH$_2$O)$_{35}$—C(O)CH$_3$,
—(CH$_2$CH$_2$O)$_5$—(CH$_2$—CH(CH$_3$)O)$_5$—C(O)CH$_3$,
—(CH$_2$CH$_2$O)$_{10}$—(CH$_2$—CH(CH$_3$)O)$_{10}$—C(O)CH$_3$,
—(CH$_2$CH$_2$O)$_3$—H, —(CH$_2$CH$_2$O)$_6$—H, —(CH$_2$CH$_2$O)$_{35}$—H,
—(CH(CH$_3$)CH$_2$O)$_3$—H, —(CH(CH$_3$)CH$_2$O)$_6$—H,
—(CH(CH$_3$)CH$_2$O)$_{35}$—H, —(CH$_2$CH$_2$O)$_3$—(CH(CH$_3$)
CH$_2$O)$_3$—H,
—(CH$_2$CH$_2$O)$_5$—(CH$_2$—CH(CH$_3$)O)$_5$—H,
—(CH$_2$CH$_2$O)$_{10}$—(CH$_2$—CH(CH$_3$)O)$_{10}$—H and
—(CH$_2$CH$_2$O)$_{18}$—((CH$_2$)$_4$O)$_{18}$—H.

Preference is given to hydrogen and the examples specified for R; particular preference is given to hydrogen and alkyl.

Examples of radicals B are —COONa, —SO$_3$Na, —COOH, —SH and in particular —OH, —NH$_2$, —NH—CH$_3$, —NH—(C$_6$H$_{11}$) and —N—(CH$_2$—CH═CH$_2$)$_2$, where —NH$_2$, —NH—CH$_3$ and —NH—(C$_6$H$_{11}$) are particularly preferred.

Examples of A$^1$ are linear or branched, divalent alkyl radicals preferably having 2 to 20 carbon atoms, or radicals of the formulae

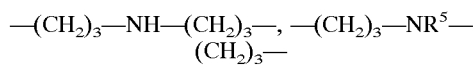

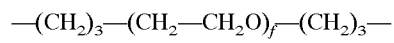

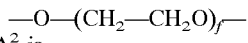

An example of A$^2$ is

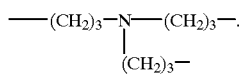

The active compound is solvolysis-resistant if, during the process of dissolution in a solvent, neither it itself nor the solvent changes chemically, so that active compound and solvent can be recovered in the original form by physical separation methods such as distillation or crystallization.

The homogeneous phase is such that it is identical at all points microscopically. Liquid and gaseous phases are suitable for the process.

Preference is given to solvent-free active compounds and homogeneous solutions of at least one water-repellent active compound and at least one solvent.

Solvents are especially liquids which are able to dissolve other gaseous, liquid and solid substances.

Those which are suitable are all inorganic and organic solvents. Suitable inorganic solvents are not only proton-containing solvents, such as H$_2$O or HNO$_3$, but also proton-free solvents, such as liquid CO$_2$ or SO$_2$. Organic solvents which can be mentioned by way of example are alcohols such as methanol, ethanol and the propanols; glycols such as ethylene glycol; ethers and glycol ethers such as tetrahydrofuran, dioxane, poly(ethylene glycol ether); ketones such as acetone; esters such as ethyl acetate; amides and other nitrogen-containing compounds such as DMF, and N-methylpyrrolidone; sulfur-containing compounds such as DMSO and sulfolane; nitro compounds such as nitrobenzene; halogenated hydrocarbons such as tri- or tetrachloroethane; and aromatic and aliphatic hydrocarbons, such as petroleum ether and mineral spirits.

However, not only the pure solvents, but also mixtures which combine solvent properties are suitable. Preference is given to solvents which, at 20° C., are miscible at most with 2% by weight of water, in particular hydrocarbon solvents.

Preferred solvents for above organosilicon compounds are water, hydrocarbons, alcohols and organic and inorganic acids, in particular water, hydrocarbons and acetic acid.

As additives, in addition to active compound and solvent, the homogeneous phase can comprise, for example, fungicides, bactericides, algicides, biocides, odorants, corrosion inhibitors, native oils, thickeners, wetting agents and catalysts.

In the examples below, unless otherwise stated,
a) all quantities are by weight;
b) all pressures are 0.1013 MPa (absolute);
c) all temperatures are 20° C.;
d) the abbreviations below were used
  dem. demineralized
  pbw parts by weight
  PDMS polydimethylsiloxane
  Me methyl radical
  Vstp volume at standard conditions 0° C. and 0.1013 MPa (absolute)
e) amine number is defined as the number of ml of 1 N HCl which are required to neutralize 1 g of organopolysiloxane.

EXAMPLES

Examples 1 to 5 below, directed to reducing the capillary forces and, in association therewith for preventing salt precipitation and improving the gas flow in the capillaries, were carried out on sample cores of dry sandstone having a gas permeability of 0.45 to 0.50 μm$^2$ from Fontainebleau, France. The cylindrical sample cores had a length of 4 cm and a diameter of 3 cm.

EXAMPLES 1 to 5

The following experimental protocol was followed using the sample cores:
a) The sample cores were dried overnight at 90° C.
b) The dried sample cores were placed in a vacuum-tight vessel and the vessel was evacuated. When vacuum was reached, the vessel was separated from the vacuum pump by closing a stopcock and dem. water was drawn into the vessel via a second connection. After the sample cores were completely immersed in dem. water, the vessel was vented. The sample cores were weighed to determine m$_v$.
c) The sample cores were dried overnight at 90° C. and then weighed to determine m$_1$.
d) The dried sample cores were each rolled in an absorbent filter paper strip of width 7 cm and length 19.2 cm in such a manner that the core was wrapped twice and the paper projected approximately 4 cm at one side. The filter paper was pressed onto the cylindrical surface by an elastic latex tube. In a water-vapor-saturated environment, the projecting paper was placed in dem.

water, so that the end of the paper dipped into the water, but the core was situated above the water surface. After seven hours the core was unwrapped and weighed to determine $m_{F1}$.

e) The reference value for dem. water of the spontaneous imbibition $Sw(sp)_{ref}$ was calculated using the equation $$Sw(sp)_{ref} = \frac{m_{F1} - m_1}{m_v - m_1}.$$

The spontaneous imbibition describes the displacement of the non-wetting phase by the wetting phase.

f) The sample cores were dried overnight at 90° C.

g) Similarly to measure b), the sample cores were soaked with organopolysiloxane solution which comprised organopolysiloxanes as hydrophobic-rendering active compound in 5% strength concentration. To remove any excess, the cores were blown free with nitrogen.

h) The sample cores were dried for 17 h at 90° C. and weighed to determine $m_2$.

i) Similarly to measure d), the dry sample cores were wrapped in filter paper strips and placed in dem. water. After seven hours, the core was unwrapped and weighed to determine $m_{F2}$.

j) The spontaneous imbibition $Sw(sp)_1$ after treating the cores with homogeneous solution was calculated using the equation $$Sw(sp)_1 = \frac{m_{F2} - m_2}{m_v - m_1}$$

k) The sample cores were again dried at 90° C. Measures i) and j) were carried out again. The process was repeated several times.

The 5 organopolysiloxane solutions below were studied in Examples 1 to 5:

TABLE 1

| Solution | % Active Compound[1] | Active Compound | Solvent |
|---|---|---|---|
| 1 | 5 | Amino functional silicone oil of the formula X, where the amine number is 0.25, the viscosity 200 and R - $CH_3$ | Isopropanol |
| 2 | 5 | Organopolysiloxane of the empirical formula $CH_3Si(OC_2H_5)_{0.8}O_{1.1}$ having a mean molecular weight of about 650 g/mol and a viscosity of about 20 mm$^2$/s at 25° C. | n-hexane |
| 3 | 5 | 100 pbw of a mixture of organopolysilicon compounds, whose preparation is described below, and 1 pbw of the catalyst di-n-butyltin dilaurate: into the top end of a reaction column, a mixture of 92 parts of methyltrichlorosilane and 51 parts of 2-ethylhexyltrichlorosilane are introduced. A mixture of 47 parts of methanol and 5 parts of water is passed in the opposite direction to this silane mixture from roughly the center of the column. From the top end of the column, hydrogen chloride is taken off, and from the bottom end of the column a mixture of organosilicon compounds having a viscosity of from 3.5 to 3.8 mm$^2 \cdot s^{-1}$ at 25° C. is taken off from the column | n-hexane |
| 4 | 5 | An end-blocked methylhydrogenpolysiloxane having a viscosity of approximately 20 mm$^2$/s at 25° C. | n-hexane |
| 5 | 5 | Condensation product of an α,ω-dihydroxymethylpolysiloxane having an Si-bonded hydroxyl group in each terminal unit and N-(2-aminoethyl)-3-aminopropyltrimethoxy-silane in the presence of KOH, having an amine number of about 0.3, a viscosity of about 1500 mm$^2$/s at 25° C. and a residual methoxy content of less than 5 mol %, based on the methoxy groups initially present in the N-(2-aminoethyl)-3-aminopropyltrimethoxysilane. | n-hexane |

[1]Solid Content
EO unit = —($CH_2$—$CH_2$—O)—
Formula X: $RSiME_2O$ $[SiMe_2O]_m$ $[SiMeR'O]_n$ $SiMe_2R$
where R' = $(CH_2)_3NH$—$CH_2$—$CH_2$—$NH_2$ The spontaneous imbibition $Sw(sp)_1$ in the cores treated with organopolysiloxane solutions decreases greatly after one day, since rendering the cores hydrophobic greatly decreases the capillary absorbent action for water. The hydrophobic and water-repellent action is retained for several days.

Table II below reports the values for spontaneous imbibition $Sw(sp)_1$ after different drying times as the sum of drying times for measures h) and k) in comparison with the reference $Sw(sp)_{ref}$.

TABLE II

| Example | Solution | Sw (sp) ref | Sw (sp)₁ (After Days) | | | | |
|---|---|---|---|---|---|---|---|
| | | | 1 | 3 | 4 | 5 | 14 |
| 1 | 1 | 0.55 | 0.03 | | 0.03 | | |
| 2 | 2 | 0.50 | 0.05 | 0.04 | | | |
| 3 | 3 | 0.50 | 0.05 | | | 0.03 | |
| 4 | 4 | 0.48 | 0.04 | | | 0.02 | 0.02 |
| 5 | 5 | 0.53 | 0.03 | | | 0.02 | 0.02 |

The spontaneous imbibition $Sw(sp)_{ref}$ of a sample core was determined in a similar manner to Examples 1–5 by measures a) to f). Thereafter, the measures below were carried out:

l) The sample cores were soaked with salt water in a similar manner to measure b). The salt water roughly corresponds in salt content to formation water and comprises, per liter, 28.5 g of NaCl, 18.5 g of $CaCl_2$, 1.6 g of $MgCl_2$ and 1.4 g of KCl, in total a salt content of 5%.

m) One sample core soaked with salt water in each case was flooded at 110° C. with the organopolysiloxane solutions 2, 4 or 5 at a rate of 10 ml/h to constant pressure. Roughly 3 pore volumes of organopolysiloxane solution were used here.

n) The sample cores were kept for 3 days at 110° C.

o) The sample cores were dried by slow pressure reduction from 0.44 to 0.1 MPa in 6 h and subsequent standing for 17 hours at 90° C. and weighed to determine $m_3$.

p) Similarly to measure d), the dry sample cores were wrapped in filter paper strips and placed in salt water. After seven hours, the core was unwrapped and weighed to determine $m_{F3}$.

q) The spontaneous imbibition $Sw(sp)_2$ was calculated using the equation $$Sw(sp)_2 = \frac{m_{F3} - m_3}{m_v - m_1}$$

r) The sample cores were dried again for 17 h at 90° C. Measures p) and q) were carried out again. The procedure was repeated several times.

Table III below reports the values for spontaneous imbibition $Sw(sp)_2$ after various drying times as the sum of the drying times in measures o)l and r) in comparison with the reference $Sw(sp)_{ref}$.

TABLE III

| Example | Solution | Sw (sp)ref | Sw (sp)₂ (After Days) | |
|---|---|---|---|---|
| | | | 1 | 5 |
| 6 | 2 | 0.50 | 0.12 | 0.10 |
| 7 | 4 | 0.55 | 0.04 | 0.03 |
| 8 | 5 | 0.48 | 0.06 | 0.04 |

The spontaneous imbibition with salt water $Sw(sp)_2$ decreases greatly with the cores treated with organopolysiloxane solution, even after storage at high temperatures. The capillary absorbent action for salt water under conditions like those prevailing in natural gas fields is greatly decreased. The pores are not plugged by salt precipitation, and the gas flow is thus stabilized.

Examples 9 and 10 for reduction of the water influx and improvement of the gas flow were carried out in the time course specified in the manner below:

A Hassler cell was filled with a core of dry Gildehause sandstone of dimensions length 10 cm and diameter 3 cm.

Nitrogen was passed through the core at a constant flow rate of 300 ml/h. The differential pressure $\Delta p_g$ between the core entrance and exit was measured.

The gas permeability $k_g$ was calculated using the Darcy equation for compressible fluids (1):

$$k_g = \frac{2Q_g \mu_g p_0 L}{A(p_1^2 - p_2^2)}, \quad (1)$$

where $Q_g$ is the gas flow rate, $\mu_g$ is the gas viscosity, $p_0$ is the ambient atmospheric pressure, L is the core length, A is the core cross sectional area, $p_1$ is the injection pressure and $p_2$ is the core exit pressure. The gas permeability $k_g$ is given below in Table IV.

The core was thereafter saturated with water under a reduced pressure of 0.002 MPa in the desiccator, fitted into a Hassler cell and water was passed through it at a constant flow rate of 30 ml/h. The differential pressure $\Delta p_w$ between the core entrance and exit was measured.

The specific water permeability $k_w$ was calculated using the Darcy equation for incompressible fluids (2):

$$k_w = \frac{2Q_w \mu_w L}{A(p_1 - p_2)}, \quad (2)$$

where $Q_w$ is the water flow rate, $\mu_w$ is the water viscosity, and L, A, $p_1$ and $p_2$ have the meanings given above. The specific water permeability $k_w$ is given in Table IV below.

20 pore volumes (PV) of silicone solution 1 as in Table I were injected into the core. The differential pressure $\Delta p_e$ between the core entrance and exit was measured. The resistance factor $RF=\Delta p_3/\Delta p_w$ was calculated as an index of the flow resistance and is given below in Table IV.

20 pore volumes of water were then injected into the core. The differential pressure $\Delta p_{wr}$ between the core entrance and exit was measured in the presence of the solution as residual phase. The residual resistance factor $RRF=\Delta p_{wr}/\Delta p_w$ was calculated as an index of the residual flow resistance and is given below in Table IV.

The RP values before injection are by definition 1. During the after flooding phase with water, the RRF values increase continuously. The increase in the RRF values is still not complete after the addition of 20 pore volumes of water. The solutions build up a permanent flow resistance for water.

Silicone solution 1 was studied in more detail below.

In parallel to these studies, the influence of residual silicone coil solution 1 on the gas permeability was studied on the same core and solution system as in Example 9 for the resistance factor for water.

TABLE IV

| | Core Material Gildehauser Sandstone | | | | | | | | | | |
|---|---|---|---|---|---|---|---|---|---|---|---|
| Example 9 Siloxane | | Gas Permeability | Water Permeability | RF Values at Injected Pore Volumes Siloxane Solution | | | | RRF Values at Injected Pore Volumes Water | | | |
| Solution 1 | Porosity | $k_g$ [$\mu m^2$] | $k_w$ [$\mu m^2$] | 5 | 10 | 15 | 20 | 5 | 10 | 15 | 20 |
| 1 | 0.231 | 2.95 | 2.71 | 2.34 | 2.60 | 2.60 | 2.86 | 4.17 | 5.73 | 7.29 | 8.59 |

TABLE V

| | Core Material: Gildehause Sandstone | | | | Residual | |
|---|---|---|---|---|---|---|
| Example 10 Siloxane Solution | Porosity | Specific Gas Permeability $k_g$ [$\mu m^2$] | Residual Water Saturation $S_{wr}$ % | Relative Gas Permeability % | Saturation With Siloxane Solution % | Relative Gas Permeability |
| 1 | 0.231 | 2.95 | 14 | 0.70 | 14 | 0.84 |

The dry core characterized in Table V was saturated with water under a vacuum of 0.002 MPa in a desiccator, fitted into a Hassler cell and water was passed through it at a constant flow rate of 30 ml/h. The differential pressure between core entrance and exit was measured and the water permeability at 100% water saturation was determined using equation (2). Thereafter, the water was displaced with gas at a flow rate of 3 l/h until a residual water saturation between 10 and 15% of the pore volume had been established. The displaced water phase was collected, and from the volume balance between original amount of water and the displaced amount of water, the residual water saturation was determined using equation (3):

$$S_{wr} = \frac{V_{wi} - V_{wp}}{V_{wi}}, \quad (3)$$

where $V_{wi}$ is the volume of water originally present in the core, and $V_{wp}$ is the volume of water produced.

At a gas flow rate of 300 ml/h, the differential pressure between core entrance and exit was then determined and the gas permeability at residual water saturation was calculated using formula (I).

The core was thereupon flooded with 20 pore volumes of silicone oil solution at a flow rate of 30 ml/h and the silicone oil solution was displaced by gas at a flow rate of 3 l/h until a residual saturation with silicone oil solution between 10 and 15% of the pore volume was established. The saturation was determined in the same manner as in the displacement of water by gas using equation (3).

The gas permeability of the treated core was thereupon determined in the same manner as that measured with residual water saturation. Table V gives a comparison of the gas permeability under residual water saturation and under residual saturation with silicone oil solution. The relative, i.e. dimensionless, gas permeability used here is the ratio of the gas permeability under residual water saturation or residual saturation with silicone oil solution to the specific gas permeability of the core. The gas permeability increased.

What is claimed is:

1. A process for treating water-containing natural gas wells and natural gas storage wells in which a homogeneous phase comprising a water-repellant, solvolysis-resistant active compound is injected into the water-bearing rock, wherein said water repellant, solvolysis-resistant active compound is an organosilicon compound.

2. The process as claimed in claim 1, in which the organosilicon compounds contain units of the general formula I

where
R is a hydrogen atom or a monovalent, divalent or trivalent hydrocarbon radical having 1 to 200 carbon atoms, which can be substituted by halogen, amino, ammonium, mercapto, acrylate or maleimide groups,
X denotes a chlorine atom, a radical of the formula $-O^-$, where as a balance of the charges, protons and/or organic or inorganic ionic substances can be present, a radical of the general formula $-OR^1$ or a radical of the general formula II

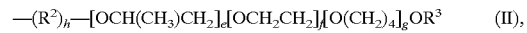

where
$R^1$ is a hydrogen atom or a hydrocarbon radical having 1 to 200 carbon atoms, which can be interrupted by one or more identical or different heteroatoms which are selected from the group consisting of O, S, N and P,
$R^2$ is a divalent hydrocarbon radical having 1 to 200 carbon atoms which can be interrupted by one or more groups of the formulae $-C(O)-$, $-C(O)O-$, $-C(O)NR^1$, $-NR^1-$, $-N^+HR^1-$, $-O-$, $-S-$ and/or can be substituted by F, Cl or Br,
$R^3$ can have a meaning of $R^1$, or is a radical of the formulae $-C(O)R^1$ or $-Si(R^1)_3$,
A is a radical of the general formula IV

where
$R^4$ is a divalent, trivalent or tetravalent hydrocarbon radical having 1 to 200 carbon atoms per radical, which can be interrupted by one or more groups of the formulae $-C(O)-$, $-C(O)O-$, $-C(O)NR^5$, $-NR^5$, $-N^+HR^5-$, $-N^+R^5R^5-$, $-O-$, $-S-$, $-(HO)P(O)-$ or $-(NaO)P(O)-$ and/or can be substituted by F, Cl or Br, where
$R^5$ is a hydrogen atom or a hydrocarbon radical having 1 to 200 carbon atoms per radical, which can be interrupted by one or more groups of the formulae $-C(O)-$, $-C(O)O-$, $-C(O)NR^5-$, $-NR^5-$, $-N^+HR^5-$, $-N^+R^5R^5-$, $-O-$ or $-S-$, and/or can be substituted by F, Cl or Br,
B can have a meaning of $R^5$ or is a radical which is selected from the group consisting of $-COO^-$, $-SO_3^-$, —OPO$_3$H$_v^{(2-y)}$—, —N$^+$R$^5$R$^5$R$^5$, —P$^+$R$^5$R$^5$R$^5$, —NR$^5$R$^5$, —OH, —SH, F, Cl, Br, —C(O)H, —COOH, —SO$_3$H, —C$_6$H$_4$—OH and —C$_m$F$_{2m+1}$,

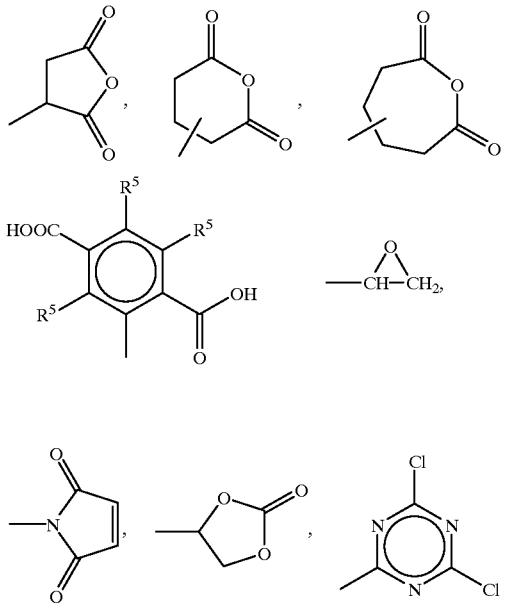

x is an inter from 1 to 20,
y is the values 0 or 1,
z depending on the valency of R$^4$, is 1, 2 or 3,
h is the values 0 or 1,
m is an integer from 1 to 20,
a, b and c each is 0, 1, 2 or 3 and the sum a+b+c<4 and
e, f and g each is an integer from 0 to 200, with the proviso that the sum e+f+g>1.

3. The process as claimed in claim 2, in which the homogeneous phase comprises solvents which, at 20° C., are miscible at most with 2% by weight of water.

4. The process as claimed in claim 1, in which the organosilicon compounds contain units of the general formulae (V) and (VI),

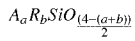
$$O_{(4-i-k-1)/2}R_iX_kSi\text{---}A^1\text{---}SiX_kR_iO_{(4-i-k-1)/2},\quad (V)$$

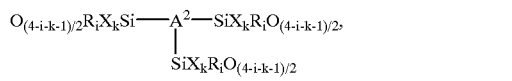
$$\begin{array}{l}O_{(4-i-k-1)/2}R_iX_kSi\text{---}A^2\text{---}SiX_kR_iO_{(4-i-k-1)/2},\\ \qquad\qquad\qquad\quad|\\ \qquad\qquad\qquad SiX_kR_iO_{(4-i-k-1)/2}\end{array}\quad (VI)$$

where
A$^2$ denotes a trivalent hydrocarbon radical having 1 to 200 carbon atoms, which can be interrupted by radicals of the formulae —C(O)—, —C(O)O—, —C(O)NR$^5$—, —NR$^5$—, —N$^+$HR$^5$—, —N$^+$R$^5$R$^5$—, —O—, —S—, —N— or —N$^+$R$^5$— and/or can be substituted by F, Cl or Br,
A$^1$ signifies a divalent radical R$^2$,
i and k each denote the values 0, 1, 2 or 3, with the proviso that i+k≦3 and
R and X have the meanings given above.

5. The process as claimed in claim 4, in which the homogeneous phase comprises solvents which, at 20° C., are miscible at most with 2% by weight of water.

6. The process as claimed in claim 1, in which the homogeneous phase comprises solvents which, at 20° C., are miscible at most with 2% by weight of water.

7. A process for treating water-containing natural gas wells and natural gas storage wells in which a homogeneous phase comprising a water-repellant, solvolysis-resistant active compound is injected into the water-bearing rock, wherein said water repellant, solvolysis-resistant active compound is a combination of solvent-soluble organosilicon compound dissolved in solvent, the organosilicon compound and solvent combinations selected from the group consisting of a) organosilicon compounds containing units of the formula $$A_aR_bSiO_{\frac{(4-(a+b))}{2}}$$

where
R denotes a hydrogen atom or a monovalent, divalent or trivalent hydrocarbon radical having 1 to 200 carbon atoms, which can be substituted by halogen, amino, ammonium, mercapto, acrylate or maleimide groups,
A is —NR$^5$R$^5$
R$^5$ denotes a hydrogen atom or a hydrocarbon radical having 1 to 200 carbon atoms per radical, which can be interrupted by one or more groups of the formulae —C(O)—, —C(O)O—, —C(O)NR$^5$—, —NR$^5$—, —N$^+$HR$^5$—, —N$^+$R$^5$R$^5$—, —O— or —S—, optimally substituted by F, Cl or Br,
a is 0, 1 or 2,
b is 1, 2, or 3,
with the proviso that at least one A is present per molecule, the sum of a+b is less than 4 and the solvent is an alcohol, a glycol, or a glycol ether;

b) organosilicon compounds containing units of the formula

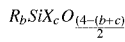
$$R_bSiX_cO_{\frac{(4-(b+c))}{2}}$$

wherein R is as defined above,
X is —OR$^1$
where
R$^1$ denotes a hydrogen atom or a hydrocarbon radical having 1 to 200 carbon atoms, optionally interrupted by one or more identical or different heteroatoms which are selected from the group consisting of O, S, N and P,
or where X is —[OCH(CH$_3$)CH$_2$]$_e$[OCH$_2$CH$_2$]$_f$[O(CH$_2$)$_4$]$_g$OR$^3$
where R$^3$ is R$^1$ or a radical of the formula —C(O)R$^1$ or —Si(R$^1$)$_3$
b is 0, 1, 2, or 3,
c is 0, 1, or 2, and
e, f, and g independently are integers from 0 to 200 with the proviso that the sum of e+f+g>1, and
the sum of b and c is less than 4, with the proviso that there is at least one X per molecule, and a hydrocarbon solvent, and c) a methylhydrogen organopolysiloxane and a hydrocarbon solvent.

8. The process of claim 7, wherein said organosilicon compound comprises an amino-functional silicone oil and the solvent comprises isopropanol.

9. The process of claim 7, wherein said organosilicon compound is an organopolysiloxane containing methyl (ethoxy)siloxy groups and the solvent is n-hexane.

* * * * *

UNITED STATES PATENT AND TRADEMARK OFFICE
CERTIFICATE OF CORRECTION

PATENT NO. : 6,182,759 B1  
DATED : February 6, 2001  
INVENTOR(S) : Burger et al.

Page 1 of 1

It is certified that error appears in the above-identified patent and that said Letters Patent is hereby corrected as shown below:

Column 17, claim 2,  
Line 15, after 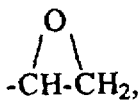

insert -- $-C(O)-CR^1=CH_2$, $-O-C(O)-CR^1=CH_2$, $-C_6H_4-(CH_2)_x-CR^1=CH_2$, --

Signed and Sealed this

Sixteenth Day of April, 2002

Attest:

Attesting Officer

JAMES E. ROGAN  
*Director of the United States Patent and Trademark Office*